United States Patent
Oroskar et al.

(10) Patent No.: US 8,391,412 B1
(45) Date of Patent: Mar. 5, 2013

(54) PN LONG CODE SHIFT FOR ACCESS ATTEMPT

(75) Inventors: Siddharth S. Oroskar, Overland Park, KS (US); Sachin R. Vargantwar, Overland Park, KS (US); Deveshkumar Rai, Overland Park, KS (US); Bhagwan Khanka, Lenexa, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 877 days.

(21) Appl. No.: 12/505,121

(22) Filed: Jul. 17, 2009

(51) Int. Cl.
*H04L 27/20* (2006.01)
*H04B 7/216* (2006.01)

(52) U.S. Cl. ......................... 375/308; 370/335

(58) Field of Classification Search .................. 375/308, 375/302, 295; 370/335, 328
See application file for complete search history.

(56) References Cited

U.S. PATENT DOCUMENTS

| | | | |
|---|---|---|---|
| 6,898,433 B1 * | 5/2005 | Rajaniemi et al. | 455/456.1 |
| 2002/0131455 A1 * | 9/2002 | Cioffi et al. | 370/503 |
| 2007/0103363 A1 * | 5/2007 | Boiero et al. | 342/357.1 |
| 2008/0057934 A1 * | 3/2008 | Sung et al. | 455/422.1 |
| 2009/0016273 A1 * | 1/2009 | Kanterakis | 370/328 |
| 2009/0111468 A1 * | 4/2009 | Burgess et al. | 455/436 |

\* cited by examiner

*Primary Examiner* — David C. Payne
*Assistant Examiner* — Brian J Stevens

(57) ABSTRACT

A method and system is disclosed for shifting the phase of a PN long code for access attempts by an access terminal in a wireless communication network. An access terminal may seek to acquire access from a base station that is detected by the access terminal above a threshold power level, even if the access terminal is further away from the base station than a threshold distance beyond which access is not normally granted. According to one embodiment, the access terminal will, upon determining that it is beyond the threshold distance, embed in an access request message an apparent distance that is smaller than the threshold distance, by phase-shifting a timing signal and encoding the access request message with the phase-shifted timing signal. The access terminal will then transmit the access request message on an air interface communication link to the base station.

23 Claims, 6 Drawing Sheets

PN LONG CODE SHIFT FOR ACCESS ATTEMPT

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

A subscriber (or user) in a service provider's wireless communication system accesses the system for communication services via an access terminal, such as a cellular telephone, pager, or appropriately equipped portable computer, for instance. When an access terminal is positioned in a cell, the access terminal (also referred to herein by "AT") communicates via an RF air interface with the BTS antenna of the cell. Consequently, a communication path or "channel" is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As a subscriber at an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

OVERVIEW

Wireless communications and services are generally available by paid subscription from multiple wireless service providers, each deploying its own wireless communication system. When a BTS of one wireless communication system is located nearby to a BTS of another system, their respective cells or sectors can physically overlap, at least partially. In practice, multiple, different wireless communication systems may be deployed within a common geographic region, thereby providing substantially overlapping wireless access coverage throughout some or all of the region. While this is particularly the case in metropolitan areas, overlapping coverage may occur in rural or less populated regions as well. It may also be the case that two or more geographic regions are each predominantly served by a different service provider, or that a particular service provider has a relatively sparse deployment compared to one or more other service providers in a particular region. Further, different wireless communication systems deployed across a certain region by two or more service providers may provide aggregate coverage throughout some or all of the region, but with relatively little overlapping coverage.

An access terminal initiates a call or data session by transmitting one or more access request messages to its serving base station. More specifically, the AT transmits a one or more "access probes" in a sequence to the base station with a random delay between each transmission in order to listen for an acknowledgement from the base station. Each probe is transmitted at a successively higher power level. If an acknowledgment is received in response to a given probe, the AT discontinues further probe transmissions in the sequence. If an acknowledgment is not received in response to a given probe, the AT transmits the next probe (after a random delay) at a higher power level than the previous probe. Once the base station acknowledges an access probe, it assigns a communication channel to the AT, and call or session setup is established using the assigned channel. If the AT does not receive an acknowledgement from the base station after transmitting all of the access probes of a given sequence, the AT may attempt access with one or more additional probe sequences as necessary until it either receives an acknowledgment and a traffic channel assignment, or the attempted access via the base station fails.

The failure of a base station to acknowledge an access probe can be due to a number of reasons, including heavy loading conditions from multiple access terminals attempting access, lack of an available traffic channel, transmission of an access probe at too low a power level for the base station to properly detect, and location of the AT at too great a distance from the base station. In practice, the AT encodes each access request using a form of timing signal that allows the base station to determine the AT's distance away. The base station may then ignore the access probe if the determined distance exceeds a threshold distance, referred to as the "cell radius." When an access attempt via the AT's serving base station fails, the AT may attempt access from a different base station.

It can sometimes happen that an AT fails to acquire access in the wireless communication system of the service provider to which the subscriber associated with the AT subscribes, and subsequently attempts and succeeds at acquiring access from the system of different service provider. When this occurs, the AT (and its associated subscriber) is said to have "roamed" from its "home" network to a "foreign" network. It can also be the case that the AT fails to acquire access in its home network because the AT is located beyond the cell radius of its serving base station, even when the AT can detect its serving base station at a power level sufficiently strong to support channel access. Thus, an AT may be forced to roam to a foreign network even though it is receiving a strong signal from its home network.

During the time that an AT is roaming, it is receiving access and transport services from the foreign network, and therefore utilizing resources of that foreign network. The wireless communication systems of different service providers are typically interconnected, supporting the flow of communications between them and allowing roaming subscribers to be connected to their home networks as necessary. In practice, wireless service providers set up "service level agreements" (SLAs) between them for, among other reasons, resolving costs associated with providing service to roaming subscribers from one another's networks. To the extent that roaming between any two service providers is symmetric—e.g., that the amount of service each network provides to subscribers of the other network is roughly equal—the roaming costs charged by each network to the other tend to even out. Nevertheless, the amount of roaming that occurs from a wireless communication system may be of interest or concern to the operator of that system.

Accordingly, embodiments of the present invention provide a method and system for enabling an access terminal to determine that it is further than a threshold distance from a base station, and to responsively embed in an access request message a distance indicator that is smaller than the threshold distance. More particularly, the access terminal may encode an access request using a phase-shifted timing signal such that the access request message, when transmitted to a base station, will appear to the base station to originate from within the cell radius.

Hence, in one respect, various embodiments of the present invention provide, in an access terminal that operates in a wireless communication system that includes a base station, a method comprising: making a determination that the access terminal is located greater than a threshold distance from the base station; responsive to at least the determination, embedding in an access request message an apparent distance that is smaller than the threshold distance by phase-shifting a timing signal and encoding the access request message with the phase-shifted timing signal; and transmitting the access request message on an air interface communication link to the base station, the access request message being a request by the access terminal for wireless access.

In another respect, various embodiments of the present invention provide, in an access terminal that operates in a wireless communication system that includes a base station, a method comprising: detecting a signal above a threshold power level from a base station that is greater than a threshold distance from the access terminal, the access terminal being located at a current location; responsive to the detection, phase-shifting a timing signal by at least an amount corresponding to a propagation delay that would result from transmitting the timing signal across a differential distance between the current location and a location that is closer than the threshold distance to the base station; encoding an access request message with the phase-shifted timing signal; and transmitting the access request message on an air interface communication link to the base station, the access request message being a request by the access terminal for wireless access.

In still another respect, various embodiments of the present invention provide an access terminal configured to operate in a wireless communication system that includes a base station, the access terminal comprising: means for detecting a signal above a threshold power level from a base station that is greater than a threshold distance from the access terminal; means for, responsive to the detection, phase-shifting a timing signal by at least an amount corresponding to a propagation delay that would result from transmitting the timing signal across a differential distance between a current location of the access terminal and a location that is closer than the threshold distance to the base station; means for encoding an access request message with the phase-shifted timing signal; and means for transmitting the access request message on an air interface communication link to the base station, the access request message being a request by the access terminal for wireless access.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate"

packet-data communications. Under IS-2000, packet-data communications are conventionally referred to as "1X-RTT" communications, also abbreviated as just "1X." Packet-data communications under IS-856 are conventionally referred to as "EV-DO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
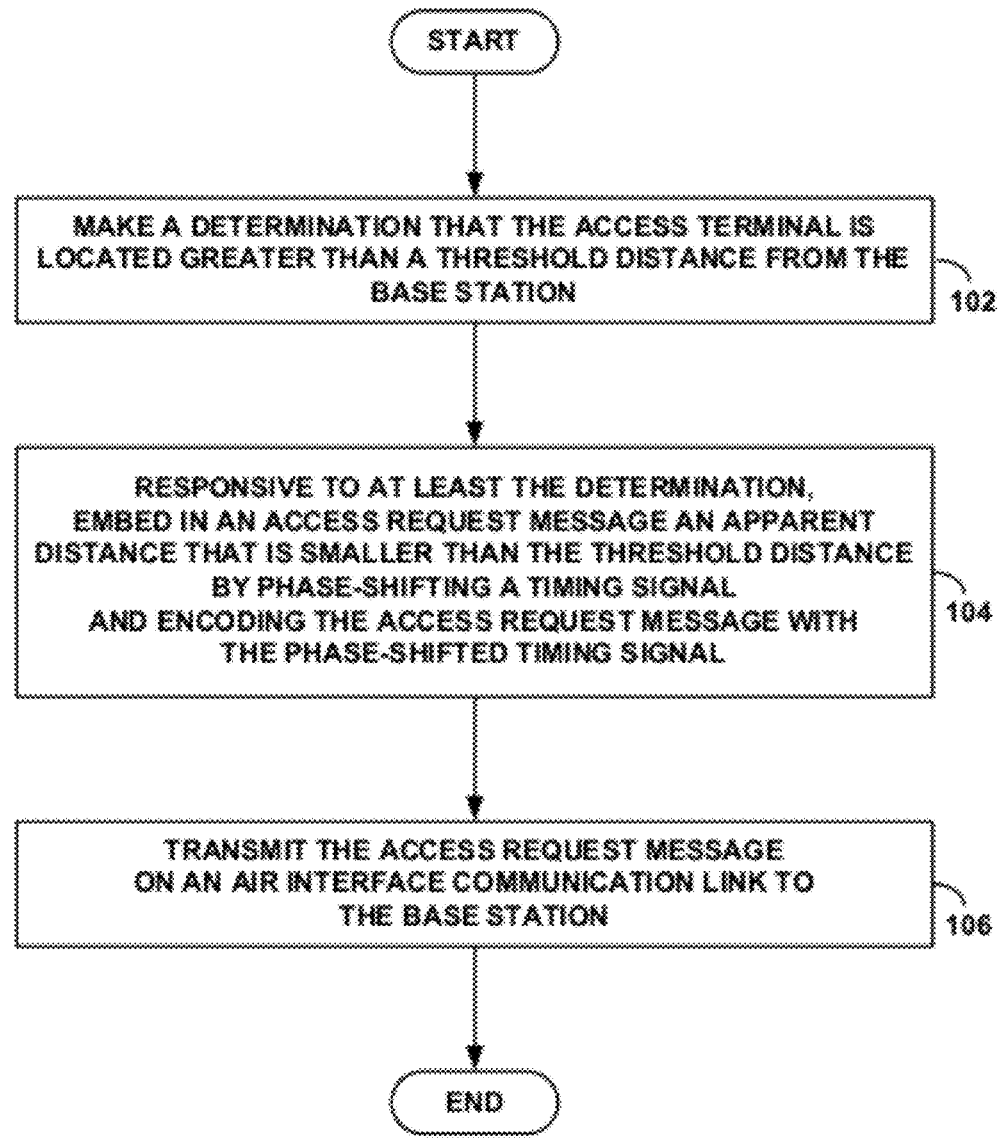
FIG. 1 is a flowchart depicting an example embodiment of a method phase-shifting a PN long code for access attempt.

FIG. 1 is a flowchart depicting an example embodiment of phase-shifting a PN long code for access attempt. By way of example, the steps of the flowchart could be implemented in an access terminal that operates according to a CDMA family of protocols in a wireless communication system that includes one or more base stations (e.g., as part of one or more RANs). At step 102, a determination is made that the access terminal is located greater than a threshold distance from a base station. For instance, the base station could be the AT's serving base station, providing coverage in a cell and/or in multiple sectors. The determination could be made in a number of ways. As an example, the base station could provide its geographic coordinates (i.e., latitude and longitude) to the AT in one or another system message, such as a "Systems Parameter Message," and the AT could determine its own geographic coordinates from a GPS system. It will be appreciated that a distance between the AT and the base station could then be calculated using the two sets of coordinates. This distance could then be compared with the threshold distance to determine whether the AT is located at greater than the threshold distance from the base station.

In accordance with the example embodiment, the threshold distance could be a cell radius. A base station's cell radius is a radial distance measured from a BTS of the base station, and is generally configured as an operating parameter of the system. Thus, the cell radius defines a circle centered on the BTS. It is possible for different BTSs to have different cell radii. The cell radius is generally used for various purposes. In particular, a base station conventionally operating according to 1X-RTT or EVDO will typically ignore access requests from access terminals that are situated beyond the cell radius (the base station's determination of an AT's distance away is described below). As part of the example embodiment, the base station (or BTS or other RAN element) could provide the cell radius (or other form of threshold distance) to the access terminal in one or another system message, such as the Systems Parameter Message. Other messages could be used as well to provide cell radius to the AT.

Responsive to the determination made at step 102, the access terminal, at step 104, embeds in an access request message an apparent distance that is smaller than the threshold distance by phase-shifting a timing signal and encoding the access request message with the phase-shifted timing signal. In further accordance with the example embodiment, the AT will determine an expected phase shift that would result from transmitting the timing signal across the actual distance between the AT and the base station (or BTS), and will also determine an artificial phase shift that would result from transmitting the timing signal across a hypothetical distance that is smaller than distance between the AT and the base station. The AT will then shift the phase of the timing signal by an amount at least as large as the difference between the expected phase shift and the artificial phase shift, thereby yielding the phase-shifted timing signal. The AT will use the phase-shifted timing signal to encode the access request message, effectively embedding a distance no larger than the hypothetical distance in the access request message.

It will be appreciated that a timing signal transmitted across any given distance between a starting point and an ending point is subject to a propagation delay given by the distance traveled divided by the propagation speed (the speed of light for an RF signal), and that propagation delay gives rise to a shift in phase of the signal at the ending point with respect to the signal's phase at the starting point. Hence the AT can determine both the expected and artificial phase shifts of the timing signal from the actual and hypothetical distances, respectively. The difference between the expected and artificial phase shifts corresponds to the difference between the actual and hypothetical distances. Thus, the phase-shifted timing signal of step 104 represents the original timing signal (i.e., prior the shifting its phase) shifted by an amount large enough to compensate for propagation delay over a distance at least as large as the difference between the actual and hypothetical distances.

In further accordance with the example embodiment, the timing signal could be a "pseudo-random number" ("PN") long code, and phase shifting the timing signal could comprise shifting the PN long code by a number of chips corresponding to at least the difference between the actual and hypothetical distances. More particularly, in a wireless communication system that operates according to a CDMA family of protocols, including IS-2000 and IS-856 (e.g., 1X-RTT and EVDO networks), an access request message takes the form of an "access probe" that includes information indicative of the request (e.g., type of call or session requested, identification of the called party, etc.) that is transmitted by the requesting AT to the base station on an "access channel" specific to a cell or sector from which access is sought. The access channel is specified by a 42-bit "access channel long code mask" (or just "long code mask") that is constructed using information typically provided to the AT in an "Access Parameters Message" or other system message(s) from the base station. The AT applies the access channel long code mask in generating a PN long code that is used to modulate, or "spread," the access probe transmission. Hence the access probe can be considered as being encoded using the PN long code (generated using the long code mask).

As described below, the AT spreads transmissions at a rate of 1.228 Mega-chips per second, each chip taking on one binary value of the PN long code and the sequence of successive chips representing the sequence of binary values in the PN long code. According to specified operation, chip-by-chip generation of the PN long code is synchronized between the AT and the base station, so that at any given instant, both generate identical binary chip values—i.e., they both generate the same phase of the PN long code at the same time. At any instant, the phase of the PN long code is determined by the specific time at that instant and by the long code mask used in generating the code. As noted, the AT uses the access channel long code mask to generate the PN long code used to spread an access probe transmission, and the base station applies the same long code mask to "de-spread" (or decode) the received access probe. However, by the time the base station receives the access probe, its own PN long code phase will have advanced with respect to that at the time the AT transmitted the probe, thereby introducing a propagation-induced phase difference. In practice, the base station uses the propagation-induced phase difference to determine the propagation delay, and hence distance to the AT. In accordance with the example embodiment, an appropriate phase shift applied to the AT's PN long code prior to spreading can advantageously cause the receiving base station to deduce an apparent distance to the AT that is smaller than the actual distance.

Shifting the phase of the PN long code at the access terminal comprises introducing an offset between the otherwise synchronous generation of the PN long codes at the AT and the base station. For a propagation speed of $3 \times 10^5$ kilometers per second (i.e., speed of light), each chip corresponds to a distance of approximately 244 meters. Thus, the AT can determine a phase shift to apply to its PN long code in terms of a particular number of chips in order to compensate for a distance at least as large as the difference between the actual and hypothetical distances referred to above. By shifting the PN long code the particular number of chips and applying the shifted PN long code to signal spreading, thereby effectively encoding the access probe using the phase-shifted PN long code, the AT effectively embeds in the access probe an apparent distance that is no larger than the hypothetical distance. The base station will consequently recover the apparent distance instead of the actual distance when decoding the access probe.

As a further aspect of the example embodiment, the AT will invoke and carry out phase shifting of the timing signal responsive not only to the distance determination of step 102, but also responsive to detection of a signal from the base station at a power level above a threshold power level. Under IS-2000 and IS-856 (as well as other CDMA-related protocols), a base station (or other RAN element) emits a pilot signal in each cell or sector. The AT monitors the strength of the pilot signal as detected from various cells and/or sectors as part of a procedure to determine from which cells and/or sectors the AT should seek and/or maintain access. Received pilot signal strength is typically measured by the AT in a form of signal-to-noise ratio referred to as "$E_c/I_0$," which signifies the energy per chip divided by total noise and interference. If $E_c/I_0$ (or other signal-strength indicator) at which the AT detects a pilot signal is above an acceptable power level (i.e., a threshold level), then the AT may seek access from the corresponding cell or sector.

It can happen that an AT will detect an acceptable pilot signal (i.e., at a signal strength above an acceptable threshold level) from a particular base station that is further away than a threshold distance. More specifically, the AT may be beyond the cell radius while still detecting a pilot signal above the threshold from the base station (or BTS). If the AT transmits an access probe to the particular base station, under conventional operation the base station will ignore the request upon a determination that the AT is beyond the cell radius. In accordance with the example embodiment, the AT will phase shift the PN long code used for encoding an access probe to the particular base station (or cell or sector from which the pilot is detected above the threshold), thereby causing the base station to infer that the AT is within the cell radius. Advantageously, the base station can then honor the AT's request for access.

Thus, in accordance with the example embodiment, the AT will invoke and carry out phase shifting of the timing signal when it detects a pilot signal (or other transmission power-level signal) above an acceptable power level from a base station that is further away than the threshold distance (e.g., cell radius). Employing both conditions—detected signal strength and distance—ensures that the AT will judiciously use the method of phase shifting the PN long code for access attempts.

At step 106, the AT transmits the access request message on an air interface communication link to the base station. In accordance with the example embodiment, the access request message is an access probe that is spread with the phase-shifted PN long code, as described above. Under IS-2000 or IS-856 (or other CDMA-related protocols), the AT may transmit a sequence of access probes, waiting for a response from the base station between each transmitted access probe, and truncating the transmission sequence if an acknowledgement is received before all of the probes of the sequence have been transmitted. The AT may also transmit one or more additional sequences of access probes following a given sequence if no acknowledgement is received to the given sequence. For each probe of each sequence transmitted, the AT will apply the actions of steps 102 and 104. By transmitting access probes appearing to the base station to originate from inside the base station's cell radius, the AT may acquire access from a base station from which it receives a strong signal even when the AT is actually located beyond the cell radius. In situations where the AT would otherwise be forced to roam to a foreign network, this procedure can advantageously help avoid unnecessary roaming.

It will be appreciated that the steps of FIG. 1 are illustrated by way of example, and that additional and/or alternative steps or alternative ordering of steps could be carried in order to implement phase-shifting a PN long code for access attempts.

Figure 2:
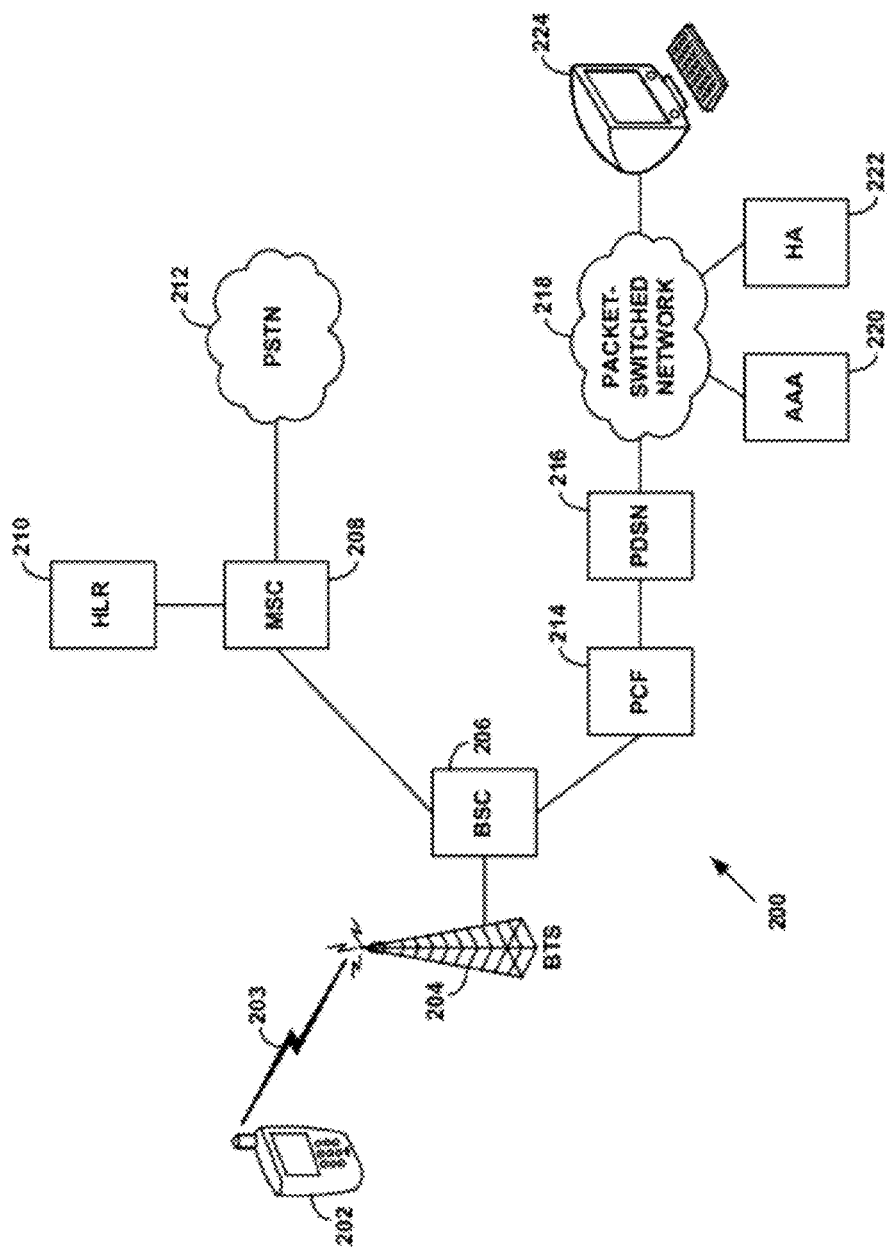
FIG. 2 is a simplified block diagram of a wireless communication system in which an example embodiment of phase-shifting a PN long code for access attempt could be carried out.

FIG. 2 shows a simplified block diagram of a wireless communication system 200 that can be operated by a wireless service provider, and in which an exemplary embodiment of phase-shifting a PN long code for access attempt can be employed. Subscribers engage in communications in the wireless communication system via access terminals, whereby access terminals provide a physical basis for interfacing with the communication system, and subscribers are associated with respective access terminals according to subscriber account information that is maintained by the system in one or more data bases. Accordingly, subscribers are represented by their respective, associated access terminals in FIG. 2. As shown, access terminal AT 202 communicates over an air interface 203 with a BTS 204, which is then coupled or integrated with a BSC 206. Transmissions over air interface 203 from BTS 204 to AT 202 represent the "forward link" to the access terminal, while transmissions over interface 203 from AT 202 to BTS 204 represent the "reverse link."

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs, other telephony circuit switches in the operator's (or in a different operator's) network, or other wireless communication systems, thereby supporting user mobility across MSC regions, roaming between systems, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 2222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism. As such, system 200, AT 202, and air interface 203, collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CDMA COMMUNICATIONS a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

b. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors as a basis to facilitate active set management, i.e., to facilitate handoff from one sector to another.

Operation in an IS-856 compliant communication system may be illustrated, again with reference to FIG. 2. To acquire an EVDO packet data connection, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

2. ENCODING ACCESS REQUESTS WITH A SHIFTED PN LONG CODE a. General Operating Principles Under both IS-2000 and IS-856, an access terminal in an idle state may request access from a wireless communication system, such as the one shown in FIG. 2, by transmitting one or more access request messages to its serving sector (or other form of coverage area), as described above. More specifically, each sector supports one or more "access channels" on its reverse links for receiving access requests from ATs operating in the sector. Each access channel in a sector is shared on a random-access basis among the ATs in sector. According to random-access procedures, there is no scheduling of access among ATs. Rather, ATs attempt to transmit on an access channel at random times, on an as-needed basis, whereby contention among ATs' access attempts is accommodated by the probabilistic nature of the timing of access attempts and further mitigated through techniques of increasing randomization of the time between requests.

An AT seeking access from a particular sector will transmit one or more sequences of access probes on an access channel for that sector, each sequence comprising a system-configurable number of access probe transmissions. Each successive access probe is transmitted at a higher power than the preceding one, with a random delay in between. The delay provides an interval in which the particular sector (BTS or other RAN element) can acknowledge the previous access probe, and the random time between probe helps avoid transmission "collisions" between access probes from different ATs that are seeking access from the same particular sector during the same time frame. Upon receiving an acknowledgement from the particular sector, the AT discontinues further access probe transmissions (if any remain) in the sequence and waits for a channel assignment message from the sector. If no acknowledgement is received within the sequence, the AT may initiate one or more additional sequences of access probe transmissions until it either receives an acknowledgement (and a traffic channel), or gives up attempting to gain access from the particular sector. In the event of failure, the AT may attempt to acquire access from a different sector, using the same procedure.

An access probe comprises an identification of the access terminal seeking access, as well information specific to the nature of the request, such as the type of call or session being sought, among other possible details. Transmission of the access probe involves spreading or modulating the probe with the PN long code, chip-by-chip. As is known in the art, the PN long code is a pseudo-random sequence of binary values (typically 1s and 0s or 1s and −1s), referred to as chips, that repeats every $2^{42}-1$ values (i.e., has a period of $2^{42}-1$). It is "pseudo-random" because, while the sequence appears largely random and possesses mathematical properties characteristic of random sequences, it is generated deterministically with a fixed period.

Operationally, the PN long code is generated by clocking successive states of a 42-bit shift register ("long code register") at a rate of 1.228 Megahertz. At each clocked state, a 42-bit long code mask is applied to the register contents, and the result is summed modulo-2 to yield a single bit value. This process yields a new bit value at every clock tick (about 0.8 microseconds), and the continuous sequence of bits constitutes the sequence of chips of the PN long code thus generated chip-by-chip at the rate of 1.228 Mega-chips per second. Excluding a register state in which all the bits are zero, there are $2^{42}-1$ unique states that can be achieved before the cycle identically repeats. The generated PN long code thus repeats every $2^{42}-1$ clock ticks (about 41.5 days).

At any given instant, the phase of the PN long code corresponds to which chip of the $2^{42}-1$ chip sequence is generated. In the absence of a long code mask, the phase is determined entirely by the state of the 42-bit long code register at the given instant. For the purposes of the discussion herein, a PN long code so generated (i.e., with no long code mask) shall be referred to as a "pure" PN long code. Any two registers that are in the same state at the same time are synchronized, and their generated pure PN long codes are in phase (i.e., generated with the same phase at the same time). In particular, when an access terminal "acquires the system" (e.g., when it first powers on), the RAN reports to the AT (e.g., in a Sync channel message) the current time and what the state of the long code register will be at a specific, designated time in the future (typically a few milliseconds beyond the current time). The AT then loads its long code register with the reported long code register state, and begins to clock its PN long code generation at the designated time (an exact clock tick). This procedure results in the AT synchronizing with the RAN, thereby generating its pure PN long code in phase with the RAN's (and the overall system's) pure PN long code.

Phase synchronization between the AT and the base station is required because, whereas the AT spreads transmissions to the base station on a chip-by-chip basis, the base station "de-spreads" (or decodes) the transmissions chip-by-chip as the transmissions are received in order to recover the transmitted data. Phase synchronization ensures that both sender (AT) and receiver (base station) are using the same chip sequence to spread and de-spread, respectively, the transmission.

As is known in the art, the effect of applying a long code mask to generation of the PN long code is to shift the phase of the generated PN long code with respect to the pure PN long code, without having to shift the state of the long code register (beyond the nominal clock-driven state evolution). In particular, the access channel long code mask for a given sector (or other form of coverage area) is constructed from the PN offset of the given sector, the base station ID for the sector, the access channel number, and a paging channel number. This information is transmitted from the sector to the AT in one or another system message (e.g., an Access Parameters Message and/or a System Parameters Message) after the AT synchronizes with the system. In applying a particular access channel long code mask during access attempts, the AT thus encodes (spreads) access probes with a PN long code having a phase determined by parameters specific to the particular access channel on which the AT seeks access. The particular sector uses the same access channel long code mask to de-spread (decode) the access probes, therefore generating a PN long code having the same phase as the one used by the AT. To the extent that nearby sectors have different parameters, they will have different access channel long code masks, and will thus generate PN long codes with phases different from the AT's PN long code phase; i.e., they will not recognize the AT's access requests.

Although the respective PN long codes of AT and base station are in phase when the AT transmits an access probe, there is a propagation delay between the time the probe is transmitted and when it is received at the base station (or other RAN element). Consequently, the phase of the base station's PN long code will have advanced by the time the given access probe is received. Operationally, the base station accommodates this delay by searching for signals within a phase "window," or "search window," defined in terms of chips. Specifically, by looking "backward" (or "forward") in the chip sequence with respect to the base station's current phase, the base station can effectively compensate for any propagation delay suffered by an incoming signal (e.g., an access probe) transmitted at an earlier time (and phase), provided the base station searches far enough backward. Since propagation delay corresponds to a distance traveled by the transmitted signal from its source, the base station can use this propagation-induced phase shift to determine the distance to the AT. In this sense, spreading transmissions with the PN long code can be viewed as embedding a distance indicator in the transmissions. Moreover, the base station can exclude from consideration signals transmitted from ATs beyond a distance corresponding to the search window. In particular, the base station can set a distance threshold such that signals originating from by the threshold distance are ignored (or otherwise not processed and/or responded to).

In practice, a radial distance from the BTS (or other antenna or receiving element of the base station) is used to define a "cell radius" as a threshold distance. To the extent that an AT's distance from a BTS provides an indicator of expected air link reliability or quality, the base station may use an AT's distance either within or beyond the cell radius to determine (possibly with other factors as well) whether or not to provide the requested access. Access probes originating from within the cell radius can be processed, and access granted (assuming other factors, such as channel availability, allow it). However, access probes originating from beyond the cell radius may be ignored, and the associated access requests denied. Note that the base station could explicitly determine an AT's distance and compare it with the cell radius, or could set its search window so as to exclude requests that originate from beyond the cell radius.

The principles discussed above are illustrated by way of example in FIG. 3. At the top of FIG. 3, an AT 302 is depicted (on the left) as being located 3 km from a BTS 304 (on the right), which has a cell radius of 2 km shown as a dashed circular arc. The BTS represents a cell or sector (or other form of coverage area) to which an AT might transmit an access probe in order to seek access. It will be appreciated that the 2-km cell radius is an example, and that other distances could be used. The AT's distance of 3 km from the BTS is also an example. A conceptual and abbreviated illustration of transmission of an access request 306 is shown below the AT 302 and BTS 304. As noted above, for a spreading rate of 1.228 Mega-chips per second and signal propagation at the speed of light, each chip corresponds to a distance of approximately 244 meters. For the purposes of the simplifying the arithmetic of the present illustration, the distance per chip is rounded to 250 meters, or one km for every four chips. This simplification should not be viewed as limiting with respect to the present invention or embodiments thereof.

In accordance with conventional operation, an access channel long code mask 308 is applied by a PN long code generator 310 of AT 302 to generate a PN long code 312-1. The PN long code is then used to encode 314 (i.e., spread) the access request 306 to yield an access probe 315, which in turn is transmitted to the BTS 304. At the BTS, the same long code mask 308 is applied by the PN long code generator 316 to generate PN long code 312-2, which in turn is used to decode 318 (i.e. de-spread) the received access probe 315. An arrow interrupted by ellipses and pointing from access probe 315 to decode block 318 at the BTS 304 represents the transmission of the access probe, which is associated with a propagation delay corresponding to the distance (3 km) traversed by the transmission.

Figure 3:
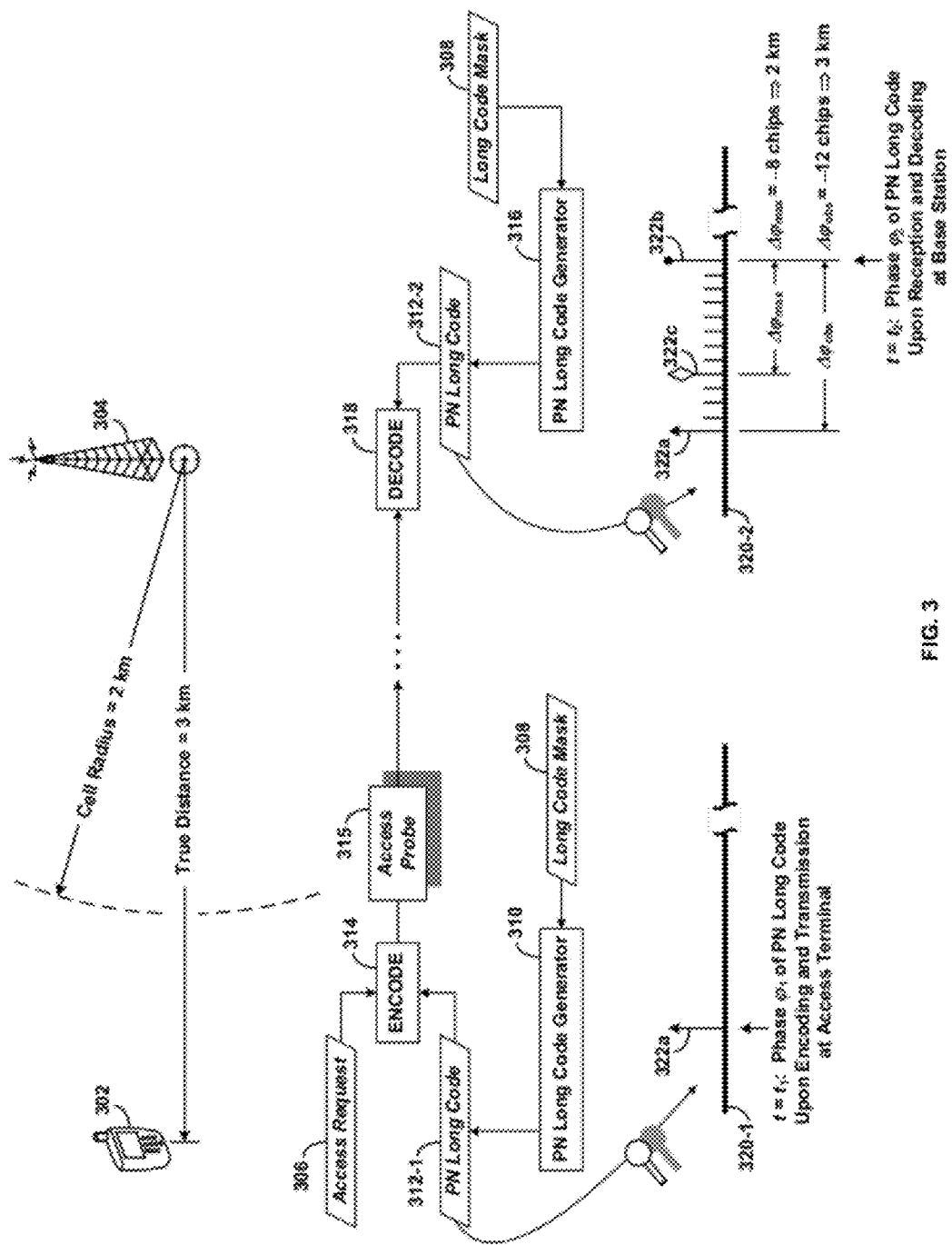
FIG. 3 depicts example operation of conventional encoding and transmitting an access probe.

The effect of propagation delay on PN long code phase shift measured by the BTS is illustrated at the bottom FIG. 3. The AT's PN long code 312-1 is depicted in a magnified view 320-1 as a horizontal line representing chip phase on the left side of the figure, while the base station's PN long code 312-2 is similarly depicted in a magnified view 320-2 on the right (cartoons of magnifying glasses represent the conceptual "blow-up" of each PN long code). An upward arrow 322a marks the phase $\phi_1$ of the PN long code 320-1; its location along the chip-phase line in the present illustration is arbitrary. In accordance with conventional operation, the phase $\phi_1$ is determined by the state of the AT's PN long code register at the particular instant of time t=$t_1$ and by the long code mask 308.

A vertical line 322b with a dot at the top marks the phase $\phi_2$ of the base station's PN long code 320-2 upon reception of the access probe at time t=$t_2$. In accordance with conventional operation, the phase $\phi_2$ is determined by the long code mask 308 and the state of the BTS's PN long code register at time t=$t_2$. The magnified view 320-2 also includes line 322a marking phase $\phi_1$ (at time t=$t_1$) for reference, as well as tick marks at each intervening chip between lines 322b and 322a. In the present example, the propagation delay $\Delta t = t_2 - t_1$ gives rise to an observed phase shift of $\Delta\phi_{obs} = \phi_2 - \phi_1 = -12$ chips over the 3 km distance (assuming the approximation of 250 meters per chip). That is, the clock (and the PN long code phase) has advanced 12 ticks (one chip per tick) over time interval $\Delta t$. Finally, a vertical, diamond-topped line 322c marks a maximum allowed phase delay $\Delta\phi_{max} = -8$ chips with respect to $\phi_2$, corresponding propagation of a hypothetical signal across a distance equal to the cell radius (2 km in the present example).

In further accordance with conventional operation, the BTS 304 (or other RAN element) will ignore (or otherwise deny) the access probe 315 from AT 302 because the access terminal was beyond the cell radius when it transmitted the access probe. As described above, the BTS could either directly compute the AT's distance and compare it to the cell radius, or the BTS could use a search window that excludes decoding any signals having phase shifts greater (i.e., more negative) than $\Delta\phi_{max} = -8$ chips (for this example), and therefore originating from beyond the cell radius.

b. Introduction of a Phase Shift to Encode an Apparent Distance

While a cell radius (or other form of distance threshold) can be used by a BTS to effectively filter out access requests from ATs deemed too far away, it can also happen that an AT located beyond the cell radius of a given BTS is able to detect the BTS at a signal level sufficient to support reliable and/or good quality channel access. More particularly, the AT may detect the pilot signal from a sector (or cell) of the given BTS at a value of $E_c/I_0$ (or other signal-strength indicator) that exceeds a threshold level, wherein detection above the threshold level is one factor used by the AT, when in an idle state, to select sectors from which to seek access. If the AT remains beyond the cell radius during all of its access probe transmissions, then according to conventional operation, it will fail to acquire a traffic channel from the given BTS. Consequently, it may then seek and possibly acquire access from an alternate BTS. In the event that the AT acquires access from an alternate BTS that is part of a foreign network, the AT will then be roaming. For instance, the AT might be located near a coverage boundary between its home network and a foreign network. In this situation, the AT could thus be forced to roam even though it can detect a strong signal from a BTS in its home network. Embodiments of the present invention help alleviate such situations.

In accordance with an example embodiment of the present invention, the AT will determine when it its located beyond the cell radius of a given BTS that the AT can detect above a threshold power level, and will responsively introduced into its PN long code a phase shift that encodes in access probe transmissions an apparent distance that is no larger than the cell radius. More particularly, when the AT is in an idle state and seeking access from a BTS that is detected above a threshold power level, the AT will compare its distance away from the BTS with the cell radius (or other distance threshold), and if its distance exceeds the cell radius, the AT will shift the phase of its PN long code by a number of chips corresponding to at least the difference between its distance from the BTS and the cell radius. The AT will then use the shifted PN long code to spread its next access probe to the BTS, and the BTS will consequently derive a distance to the AT that is smaller than the cell radius. Advantageously, the BTS can then honor the AT's request for access, thereby helping to avoid situations that can lead to unnecessary roaming. The AT may repeat this procedure for all access probes of a sequence (or sequences) transmitted to the BTS until the AT either succeeds or fails in acquiring access from the BTS.

Figure 4:
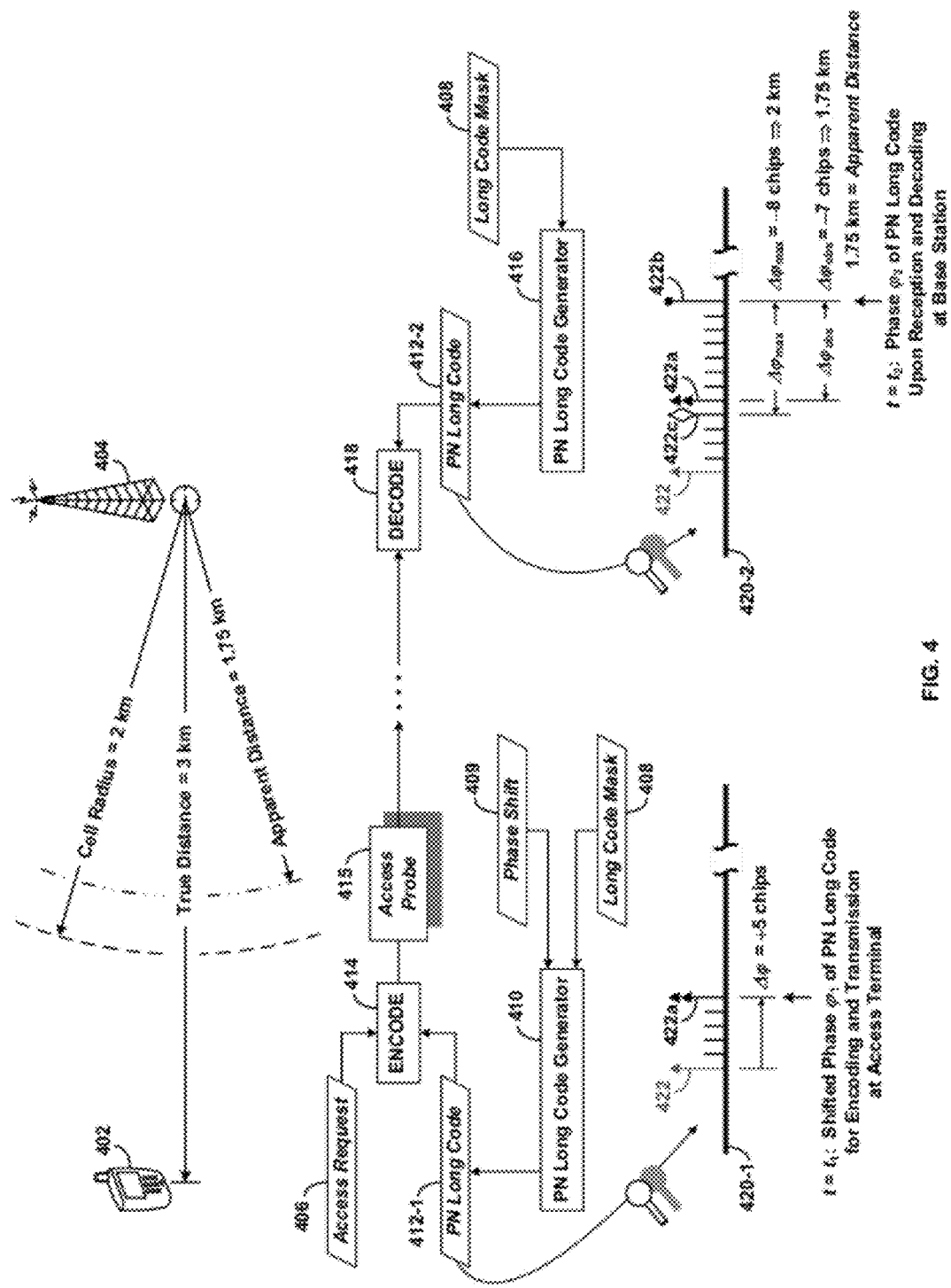
FIG. 4 depicts example operation of encoding and transmitting an access probe using a phase-shifted PN long code.

FIG. 4 illustrates operation of the example embodiment, drawing upon some of the concepts discussed in connection with FIG. 3. At the top of FIG. 4, an AT 402 is depicted (on the left) as being located 3 km from a BTS 404 (on the right), which has a cell radius of 2 km shown as a dashed circular arc. As with the illustration in FIG. 3, the 2-km cell radius is an example, and other distances could be used. Also shown is a dashed-dotted circular arc representing an apparent distance (discussed below) of 1.75 km. The process of spreading and transmitting an access request 406 in accordance with the example embodiment is depicted below AT 402 and BTS 404 in FIG. 4. As with example in FIG. 3, the distance per chip is rounded to 250 meters in order to simplify the arithmetic of the current illustration. This simplification should not be viewed as limiting with respect to the present invention or embodiments thereof.

Assuming by way of example that the AT 402 detects the pilot signal from the BTS 404 above a threshold value of $E/I_0$ (or other signal-strength indicator), the circumstances illustrated are then those for which the example embodiment (as well as other possible embodiments) of the present invention is (are) directed. In accordance with the example embodiment, and under the example circumstances illustrated in FIG. 4, the AT 402 will determine that it is 3 km from the BTS 404, and will also know that the cell radius is 2 km. For instance, the AT can obtain its geographic coordinates (e.g., latitude and longitude) from a GPS system signal or message, and the geographic coordinates and cell radius of the BTS from one or another system message. The AT can then determine its distance from the BTS and compare it to the cell radius. Responsive to determining that it is located beyond the cell radius, the AT will shift the phase of it PN long code used for access attempts in a manner illustrated in the middle and bottom portions of FIG. 4.

Under the example circumstances, the AT will determine that it is located 1 km beyond the cell radius, corresponding to four chips. Hence, the AT must shift the phase of its PN long code by at least four chips. In accordance with the example embodiment, the AT will include an additional one-chip margin of shift so as to ensure that its access probe appears to the BTS as having originated from within the cell radius. It will be appreciated that a larger marginal shift could be used. For example, a larger marginal shift might more reliably account for a situation in which the AT is moving away from the BTS during the course of spreading and transmission of an access probe. The one-chip margin of the present illustration is sufficient to exemplify operation, however. Thus, for the circumstances of the current illustration, the AT determines that a 5-chip shift should be introduced into the PN long code.

As shown in FIG. 4, an access channel long code mask 408 and a phase shift 409 are applied to PN long code generator 410 of AT 402 to generate a PN long code 412-1. The phase shift 409, corresponding to the 5-chip shift introduced by the AT, is discussed further below. The PN long code is then used to encode 414 (i.e., spread) the access request 406 to yield an access probe 415, which is transmitted to the BTS 404. At the BTS, the same access code long code mask 408 is applied by the PN long code generator 416 to generate PN long code 412-2, which in turn is used to decode 418 (i.e., de-spread) the received access probe 415. Note, however, the PN long code generated conventionally at the BTS 404, so it does not include the phase shift 409 that is used by the AT 402. As with FIG. 3, an arrow interrupted by ellipses and pointing from access probe 415 to decode block 418 at the BTS 404 represents the transmission of the access probe, which is associated with a propagation delay corresponding to the distance (3 km) traversed by the transmission.

The combined effect of the introduced phase shift 409 and propagation delay on PN long code phase shift as measured by the BTS is illustrated at the bottom FIG. 4. In a manner similar to that shown in FIG. 3, the AT's PN long code 412-1 is depicted in a magnified view 420-1 of chip phase on the left side of the figure, while the base station's PN long code 412-2 is similarly depicted in a magnified view 420-2 on the right (as with FIG. 3, cartoons of magnifying glasses represent the conceptual "blow-up" of each PN long code). In the illustration of FIG. 4, an upward double-headed arrow 422a marks the phase $\phi_1$ of the PN long code 420-1 as generated including the phase shift 409. For reference, a phase shift that would be generated in the absence of phase shift 409 is marked by an upward gray arrow 422. In accordance with operation of the example embodiment, the phase $\phi_1$ is determined by the state of the AT's PN long code register at the particular instant of time $t=t_1$, the long code mask 408, and by the phase shift 409. As illustrated, $\phi_1$ appears shifted by $\Delta\phi=+5$ chips with respect to the phase marked by line 422 (the tick marks shown each correspond to one chip). Viewing PN long code generation as a clock, the PN long code 420-1 is set five ticks ahead of the time $t=t_1$.

On the right side of FIG. 4, a vertical line 422b with a dot at the top marks the phase $\phi_2$ of the base station's PN long code 420-2 upon reception of the access probe at time $t=t_2$. The phase $\phi_2$ is determined by the state of the BTS's PN long code register at time $t=t_2$ and by the long code mask 408, but, being conventionally generated, does not include the phase shift 409. The magnified view 420-2 also includes a line 422a marking phase $\phi_1$ (at time $t=t_1$) for reference, as well as tick marks at each intervening chip between lines 422b and 422a; again, $\phi_1$ does include the phase shift 409.

As with the example in illustrated FIG. 3, the propagation delay $\Delta t=t_2-t_1$ will give rise to a phase shift of $-12$ chips over the 3 km distance (assuming the approximation of 250 meters per chip). However, the phase shift 409 introduced $\Delta\phi=+5$ chips into the PN long code 412-1 generated at time $t=t_1$ at the AT 402. Hence, while the clock (and the PN long code phase) has advanced 12 ticks (one chip per tick) over time interval $\Delta t$, five of those ticks have been effectively subtracted from the PN long code 412-1 used to spread the access code 415. As a result, the BTS 404 derives an observed phase shift of $\Delta\phi_{obs}=\phi_2-\phi_1=-7$ chips, corresponding to an apparent distance of 1.75 km, which is smaller than the cell radius. As in FIG. 3, a vertical, diamond-topped line 422c again marks a maximum allowed phase delay $\Delta\phi_{max}=-8$ chips with respect to $\phi_2$, corresponding propagation of a hypothetical signal across a distance equal to the cell radius (2 km in the present example). However, with operation in accordance with the example embodiment, the line 422a marking $\phi_1$ is now seen to lie closer to the current phase $\phi_2$ (at time $t=t_2$) at the BTS than does the line 422c marking $\Delta\phi_{max}$. Advantageously, the BTS 404 concludes that the AT 402 is located within the cell radius.

Because the BTS derives a distance to the AT that smaller than the cell radius, the BTS can respond to the access request as transmitted in the access probe. While this does not guarantee that the BTS will respond, or that it can assign a traffic channel to the AT (for instance, there may be none available at the time of the request), the example embodiment of the invention does ensure that the BTS will not fail to respond on account of the AT's distance exceeding the cell radius. Thus, the AT will not be forced to attempt access from a different BTS (and possibly one in a foreign network) only on the basis of the AT's location outside of the cell radius. Advantageously, embodiments of the present invention, including the example embodiment illustrated herein, can help increase the success rate of access attempts as well as help avoid unnecessary roaming.

In the embodiment illustrated by way of example in FIG. 4, the phase shift 409 is depicted as a separate element from the long code mask 408. In practice there can be multiple ways to implement the introduction of the phase shift. In further accordance with the example embodiment, the phase shift $\Delta\phi$ is introduced by way of an adjustment to the access channel long code mask 408 to yield a "modified long code mask" that is then applied to the PN long code generator 414. More specifically, as discussed above, the effect of a long code mask is to introduce a phase shift with respect to the pure PN long code that would be generated purely by the PN shift register, in the absence of a long code mask. Thus, for example, the access channel long code mask (or more generally, any long code mask) yields a particular phase shift when applied to generation of the PN long code. Moreover, as is known in the art, a long code mask can be determined analytically so as to achieve any desired phase shift when applied to a pure PN long code.

It follows that a desired phase shift $\Delta\phi$ can be introduced by: (1) determining a first phase of the PN long code that is generated using just the access channel long code mask; (2) computing a second phase by adding $\Delta\phi$ (e.g., as measured in a number of chips) to the first phase; (3) analytically determining a modified long code mask that will result in the phase-shifted PN long code when applied to the output of the long code shift register; and (4) applying the modified long code mask to the PN long code generator. Techniques for analytical derivation of a long code mask for achieving a given phase shift when applied to PN long code generation are well-known in the art, and not discussed further herein.

Upon acquisition of a reverse traffic channel from the BTS following phase shifting the PN long code mask for access attempts according to the example embodiment, the AT will then revert to conventional communications with the BTS (and/or other RAN elements). In particular, the AT will spread its transmissions on the reverse traffic channel using its traffic channel mask, according to well-know protocols and methods of IS-2000 and/or IS-856, for example.

3. EXAMPLE EMBODIMENT OF PHASE-SHIFTING A PN LONG CODE FOR ACCESS ATTEMPTS

The example embodiment described above in connection with FIG. 4 can be implemented as a method carried out on an access terminal or other communication device that operates according to IS-2000 and/or IS-856 in a similarly-compliant wireless communication system such as the one described above in connection with FIG. 2. The logical steps and operations of the method are described in the next subsection. Example means for carrying out the method are described in the subsequent subsection.

a. Example Method Implementation

Figure 5:
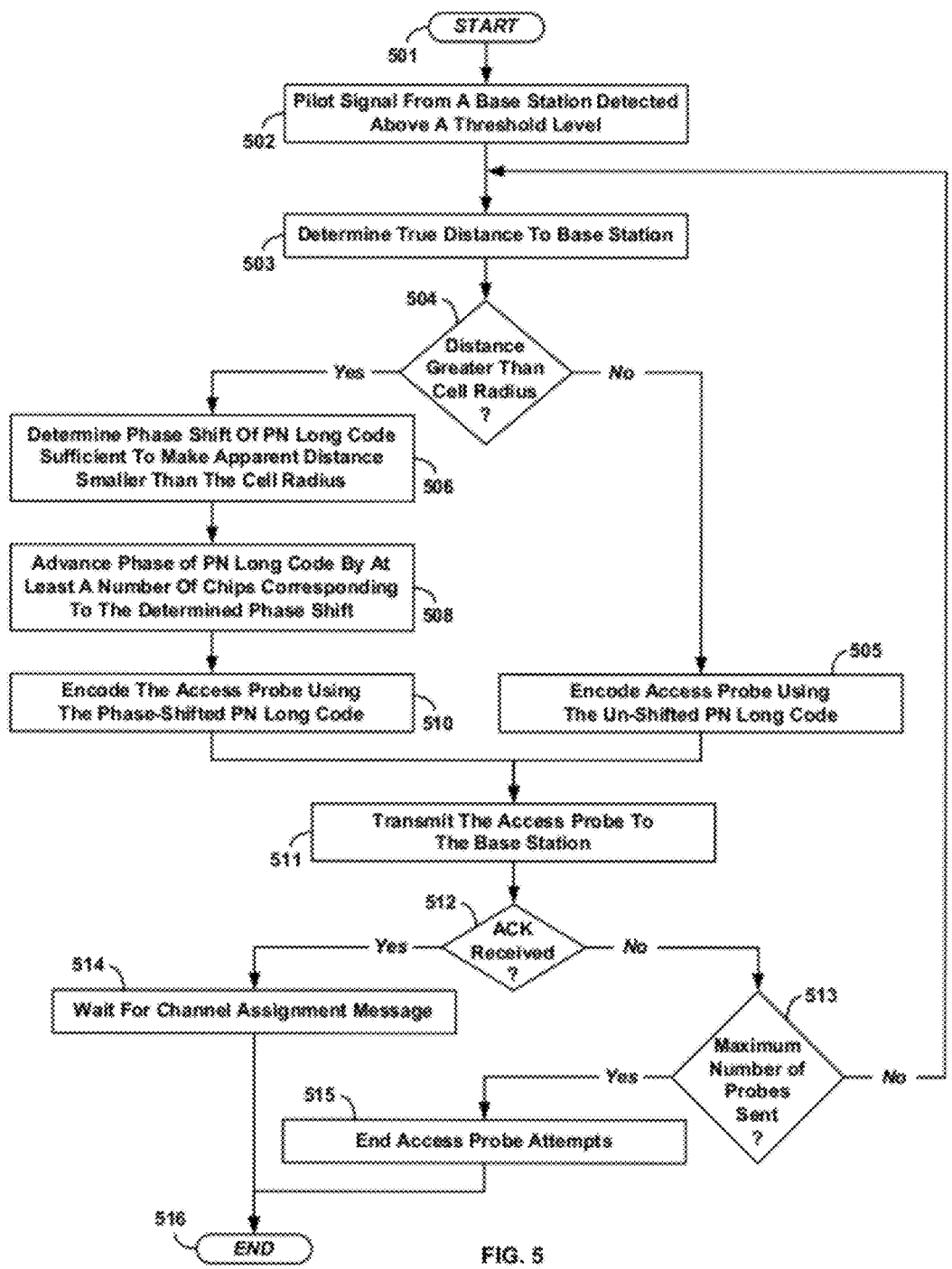
FIG. 5 is a flowchart depicting an example implementation of logical operational steps for carrying out phase-shifting a PN long code for access attempt.

An implementation of the example embodiment illustrated in the form of a logical flowchart is shown in FIG. 5. As such, the illustrated steps could be implemented in the form of computer software (or other machine-language instructions) stored in one or more forms of computer readable memory and/or media in an access terminal (or similar device) operating in a system such as that illustrated in FIG. 2, and executed by one or more processors of the access terminal.

At the start 501 of the process, the AT is in an idle state and seeking access from the RAN. Specifically, the AT will seek to acquire a traffic channel from its serving sector. Although the AT has no traffic channel while in an idle state, it will have obtained the access channel long code mask for its serving sector according to conventional operation under IS-2000 and/or IS-856, as well as the geographic coordinates (or other form of location information) of the BTS of the sector. The AT will have also previously synchronized PN long code generation with the system (again, according to conventional operation). In accordance with the example embodiment, the AT will also have obtained the cell radius for the BTS of its serving sector. For instance, the cell radius could be added to one or another existing system message (e.g., a System Parameters Message).

At step 502, the AT determines that it is detecting a pilot signal from its serving sector (or other form of coverage area) above a threshold level. As discussed above, this could entail comparing $E_c/I_0$ (or other signal-strength indicator) with a threshold value. In further accordance with the example embodiment, the threshold value could be pre-configured and stored in the AT's memory. Alternatively, the threshold value could be supplied by the RAN in one or another system message, and then stored in the AT's memory or other form of data storage.

At step 503, the AT determines its distance from the BTS of the serving sector. In accordance with the example embodiment, the AT will first determine its own geographic location coordinates. For example, the AT can use a GPS system to determine its location according to well-known protocols and procedures. The AT can then use its own location coordinates and those of the BTS to calculate its distance from the BTS according to well-known geographic distance formulas. For purpose of the present discussion, this distance is referred to herein as the "true distance" to the base station (or BTS).

The AT next compares (step 504) its true distance from the BTS with the cell radius. If the true distance is less than (or no larger than) the cell radius ("No" branch from step 504), then the AT proceeds with transmitting an access probe according to conventional operation. Specifically, at step 505 the AT spreads (encodes) an access probe using the un-shifted PN long code generated using the access channel long code mask. This corresponds to the AT encoding described above in connection with FIG. 3. The AT then transmits the access probe to the serving sector at step 511.

If the true distance is greater than the cell radius ("Yes" branch from step 504), then the AT applies phase shifting to the PN long code in accordance with the description above in connection with FIG. 4. More specifically, if the AT determines that its true distance from the BTS is greater than the cell radius, then at step 506 the AT determines a phase shift to the PN long code that will be sufficient to encode an apparent distance that is smaller than the cell radius. For instance, the AT can determine a number of chips that corresponds to a differential distance that is equal to the difference between the true distance and the cell radius. The determined phase shift would then be at least this number of chips, wherein a larger number of chips would provide an additional margin of phase shift by corresponding to a distance larger than the differential distance.

At step 508, the AT advances the phase of its PN long code by the determined phase shift, thereby yielding a phase-shifted PN long code. As described above, the determined phase shift can be realized by using a modified long code mask in PN long code generation. For instance, the AT could determine the phase of the PN long code that is generated using the access channel long code mask, computationally advance that phase by the determined phase shift, and then apply one or another known analytical techniques to determine the modified long code mask that will generate the phase-shifted PN long code. The modified long code mask will then be applied to PN long code generation to yield the phase-shifted PN long code. It will be appreciated that an analytical technique for determining the modified long code mask could be implemented as a computational algorithm in computer-executable code.

The AT then (at step 510) uses the phase-shifted PN long code to spread an access probe. This corresponds to encoding the access probe according to the example embodiment described above in connection with FIG. 4. The AT then transmits the access probe to the serving sector at step 511, as it did following step 505 for spreading with the un-shifted PN long code.

Starting from step 511, the process is the same for access probes spread with either the un-shifted PN long code or the shifted PN long code. Specifically, at step 512 the AT determines whether or not an acknowledgement to the transmitted access probe has been received from the serving base station. In practice, this step corresponds to waiting upto the random delay between access probe transmissions of a sequence, such as that described above. Thus if no acknowledgement is received within (and up to) the random delay ("No" branch from step 512), the AT then determines at step 513 if it has already sent a maximum number or access probes. The maximum number could be the maximum number in a sequence of access probes and/or a maximum number in multiple sequences of an access attempt.

If the maximum number of access probes has not been transmitted ("No" branch from step 513), then the process returns to step 503. Thus, the example embodiment of the method may be carried out for each access probe of a sequence comprising an access attempt by the AT. If the maximum number of access probes has been transmitted ("Yes" branch from step 513), then the AT (at step 515) ends its attempt to acquire access from the serving base station. This represents a failed access attempt, in which case the AT may seek access from a different sector (or BTS). The process then ends at step 516.

If (at step 512) an acknowledgement is received within (and up to) the random delay ("Yes" branch from step 512), the AT then waits for a channel assignment message (or and enhanced channel assignment message) from the serving sector. In this case, the AT will acquire a traffic channel and can proceed with a call or other form of communication session according to known protocols and methods of IS-2000 and/or IS-856 (or other CDMA-related protocol). Again, the process ends at step 516.

It will be appreciated that the steps of FIG. 5 are illustrated by way of example, and that additional and/or alternative steps or alternative ordering of steps could be carried in order to achieve phase-shifting a PN long code for access attempt. For example, the AT could first determine that it is located beyond the cell radius of it serving sector and then determine if it detects a pilot signal above the threshold level. Other modifications are possible as well.

b. Example Access Terminal

Figure 6:
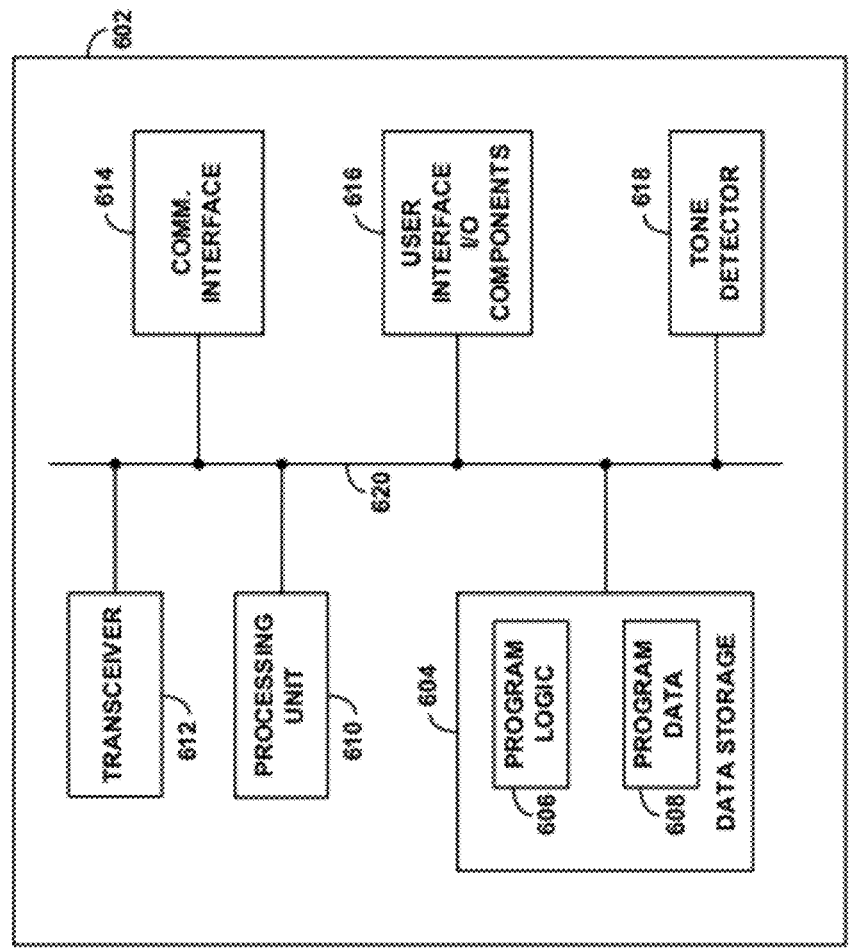
FIG. 6 shows an example access terminal in which phase-shifting a PN long code for access attempt could be implemented.

FIG. 6 is a simplified block diagram depicting functional components of an example access terminal 602 in which phase-shifting a PN long code for access attempts may be implemented. The example AT 602 could be a cell phone, a personal digital assistant (PDA), a pager, a wired or wirelessly-equipped notebook computer, or any other sort of device. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 602 relevant to phase-shifting a PN long code for access attempts are discussed briefly below.

Communication interface 614 in combination with transceiver 612, which may include one or more antennas, supports forward and reverse link channels for communications with the network, including transmission of access probes, and reception of various system message discussed above that convey access channel information, synchronization information, and BTS location information. Interface 614 also incorporates support for generation of the PN long code, application of the long code mask, and phase shifting the PN long code in accordance with the example embodiment. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation such as that discussed above and illustrated in FIG. 5. Further, program data 608 may be arranged to store algorithms for determining and comparing distances as described above, as well as computing a phase shift for encoding an apparent distance in access requests. Program data 608 could also comprise storage for various parameters of the method (e.g., cell radius, etc.), also discussed above.

It will be appreciated that there can be numerous specific implementations in an access terminal such as AT 602 of phase-shifting a PN long code for access attempts. Further, one of skill in the art would understand how to devise and build such an implementation. As such, AT 602 is representative of means for carrying out the method of phase-shifting a PN long code for access attempts in accordance with the methods and steps described herein by way of example.

4. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal that operates in a wireless communication system that includes a base station, a method comprising:

making a determination that the access terminal is located greater than a threshold distance from the base station;

responsive to at least the determination, embedding in an access request message an apparent distance that is smaller than the threshold distance by phase-shifting a timing signal and encoding the access request message with the phase-shifted timing signal; and transmitting the access request message on an air interface communication link to the base station, the access request message being a request by the access terminal for wireless access, wherein the wireless communication system operates according to a CDMA family of protocol, including IS-2000 and IS-856, wherein the threshold distance is a cell radius measured from the base station, wherein the timing signal is a pseudo-random number (PN) long code, and wherein embedding in the access request message an apparent distance that is smaller than the threshold distance by phase-shifting the timing signal comprises:

computing a difference between (i) a distance from the access terminal to the base station and (ii) the cell radius; and phase-shifting the PN long code by a particular number of chips corresponding to at least the difference, thereby generating a shifted PN long code.

2. The method of claim 1, wherein making the determination that the access terminal is located greater than a threshold distance from the base station comprises:

determining a distance between the access terminal and the base station by comparing location coordinates of the access terminal with location coordinates of the base station; and comparing the distance between the access terminal and the base station with the threshold distance.

3. The method of claim 1, wherein embedding in the access request message an apparent distance that is smaller than the threshold distance is further responsive to determining that a signal received from the base station is detected above a threshold power level by the access terminal.

4. The method of claim 3, wherein the wireless communication system operates according to a CDMA family of protocol, including IS-2000 and IS-856,
wherein the signal received from the base station is a pilot signal,
and wherein determining that the signal received from the base station is detected above a threshold power level comprises determining that the pilot signal is detected above a threshold strength.

5. The method of claim 1, wherein the PN long code is generated so as to have a reference phase that is determined in part by a long code mask, and wherein phase-shifting the PN long code by the particular number of chips comprises:
determining a modified long code mask that will cause the PN long code to be generated so as to have a modified phase that is shifted with respect to the reference phase by the particular number of chips; and
using the modified long code mask to generate the shifted PN long code.

6. The method of claim 1, wherein the access request message is an access probe, and wherein encoding the access request message with the phase-shifted timing signal comprises modulating the access probe with the shifted PN long code.

7. The method of claim 6, wherein transmitting the access request message on the air interface communication link to the base station comprises transmitting at least one modulated access probe to the base station.

8. The method of claim 1, wherein making the determination that the access terminal is located greater than a threshold distance from the base station comprises determining a current distance between the access terminal and the base station,
and wherein phase-shifting the timing signal comprises:
determining an expected phase shift that would result from a propagation delay of transmitting the timing signal across the current distance;
determining an artificial phase shift that would result from a propagation delay of transmitting the timing signal across a distance that is smaller than the threshold distance; and
advancing a phase of the timing signal by an amount at least as large as a difference between the expected phase shift and the artificial phase shift.

9. The method of claim 8, wherein the timing signal is pseudo-random number (PN) long code,
wherein the expected phase shift corresponds a first number of chips and the artificial phase shift corresponds to a second number of chips,
and wherein advancing the phase of the timing signal by an amount at least as large as a difference between the expected phase shift and the artificial phase shift comprises shifting the PN long code by a third number of chips, the third number being at least as large as a difference between the first number and the second number.

10. In an access terminal that operates in a wireless communication system that includes a base station, a method comprising:
detecting a signal above a threshold power level from a base station that is greater than a threshold distance from the access terminal, the access terminal being located at a current location;
responsive to the detection, phase-shifting a timing signal by at least an amount corresponding to a propagation delay that would result from transmitting the timing signal across a differential distance between the current location and a location that is closer than the threshold distance to the base station;
encoding an access request message with the phase-shifted timing signal; and
transmitting the access request message on an air interface communication link to the base station, the access request message being a request by the access terminal for wireless access,
wherein the wireless communication system operates according to a CDMA family of protocol, including IS-2000 and IS-856,
wherein the timing signal is a pseudo-random number (PN) long code,
and wherein phase-shifting the timing signal by at least an amount corresponding to a propagation delay that would result from transmitting the timing signal across a differential distance between the current location of the access terminal and a location that is closer than the threshold distance to the base station comprises phase-shifting the PN long code by a particular number of chips corresponding to at least the differential distance, thereby generating a shifted PN long code.

11. The method of claim 10, wherein the wireless communication system operates according to a CDMA family of protocol, including IS-2000 and IS-856,
wherein the signal received from the base station is a pilot signal,
and wherein detecting the signal above the threshold power level from a base station comprises determining that the pilot signal is detected above a threshold strength.

12. The method of claim 10, wherein detecting the signal above the threshold power level from a base station that is greater than the threshold distance from the access terminal comprises determining that the current location is greater than the threshold distance from the base station.

13. The method of claim 12, wherein determining that the current location is greater than the threshold distance from the base station comprises:
determining the current location; and
determining a location of the base station.

14. The method of claim 10, wherein the PN long code is generated so as to have a reference phase that is determined in part by a long code mask, and wherein phase-shifting the PN long code by the particular number of chips comprises:
determining a modified long code mask that will cause the PN long code to be generated so as to have a modified phase that is shifted with respect to the reference phase by the particular number of chips; and
using the modified long code mask to generate the shifted PN long code.

15. The method of claim 10, wherein the access request message is an access probe,
wherein the threshold distance is a cell radius measured from the base station,
and wherein encoding the access request message with the phase-shifted timing signal comprises embedding in the access probe an apparent distance that is smaller than the cell radius by modulating the access probe with the shifted PN long code.

16. The method of claim 15, wherein transmitting the access request message on the air interface communication link to the base station comprises transmitting at least one modulated access probe to the base station.

17. An access terminal configured for operation in a wireless communication system that includes a base station, the access terminal comprising:
means for detecting a signal above a threshold power level from a base station that is greater than a threshold distance from the access terminal;

means for, responsive to the detection, phase-shifting a timing signal by at least an amount corresponding to a propagation delay that would result from transmitting the timing signal across a differential distance between a current location of the access terminal and a location that is closer than the threshold distance to the base station;

means for encoding an access request message with the phase-shifted timing signal; and means for transmitting the access request message on an air interface communication link to the base station, wherein the access request message is a request by the access terminal for wireless access, wherein the wireless communication system operates according to a CDMA family of protocol, including IS-2000 and IS-856, wherein the timing signal is a pseudo-random number (PN) long code, and wherein means for phase-shifting the timing signal by at least an amount corresponding to a propagation delay that would result from transmitting the timing signal across a differential distance between the current location of the access terminal and a location that is closer than the threshold distance to the base station comprise means for shifting the PN long code by a particular number of chips corresponding to at least the differential distance, thereby generating a shifted PN long code.

18. The access terminal of claim 17, wherein operation of the wireless communication system is according to a CDMA family of protocol, including IS-2000 and IS-856, wherein the signal received from the base station is a pilot signal, and wherein means for detecting the signal above the threshold power level from a base station comprise means for determining that the pilot signal is detected above a threshold strength.

19. The access terminal of claim 17, wherein means for detecting the signal above the threshold power level from a base station that is greater than the threshold distance from the access terminal comprise means for determining that the current location is greater than the threshold distance from the base station.

20. The access terminal of claim 19, wherein means for determining that the current location is greater than the threshold distance from the base station comprise:

means for determining the current location; and
means for determining a location of the base station.

21. The access terminal of claim 17, wherein the PN long code is generated so as to have a reference phase that is determined in part by a long code mask, and wherein means for phase-shifting the PN long code by the particular number of chips comprise:

means for determining a modified long code mask that will cause the PN long code to be generated so as to have a modified phase that is shifted with respect to the reference phase by the particular number of chips; and means for using the modified long code mask to generate the shifted PN long code.

22. The access terminal of claim 17, wherein the access request message is an access probe, wherein the threshold distance is a cell radius measured from the base station, and wherein means for encoding the access request message with the phase-shifted timing signal comprise means for embedding in the access probe an apparent distance that is smaller than the cell radius by modulating the access probe with the shifted PN long code.

23. The access terminal of claim 22, wherein means for transmitting the access request message on the air interface communication link to the base station comprise means for transmitting at least one modulated access probe to the base station.

* * * * *